(12) United States Patent
Barret et al.

(10) Patent No.: US 7,451,074 B2
(45) Date of Patent: Nov. 11, 2008

(54) EMBEDDED MICROPROCESSOR EMULATION METHOD

(75) Inventors: Gauthier Barret, Lancey (FR); Jean-François Pollet, Jarrie (FR); Francis Lamotte, Crolles (FR)

(73) Assignees: Dolphin Integration, Meyland (FR); Raisonance, Crolles (FR)

( * ) Notice: Subject to any disclaimer, the term of this patent is extended or adjusted under 35 U.S.C. 154(b) by 1176 days.

(21) Appl. No.: 10/103,349

(22) Filed: Mar. 21, 2002

(65) Prior Publication Data

US 2002/0162094 A1 Oct. 31, 2002

(30) Foreign Application Priority Data

Mar. 21, 2001 (FR) .................................. 01 03853

(51) Int. Cl.
*G06F 9/455* (2006.01)
(52) U.S. Cl. ................................ 703/28; 703/14; 716/4
(58) Field of Classification Search .................. 703/28, 703/14, 24; 716/4, 5; 710/306; 711/170
See application file for complete search history.

(56) References Cited

U.S. PATENT DOCUMENTS 5,704,048 A * 12/1997 Fleck et al. .................. 710/306
6,820,184 B2 * 11/2004 Russo et al. ................. 711/170

FOREIGN PATENT DOCUMENTS

| EP | 0 462 328 A | 12/1991 |
| EP | 0 957 431 A1 | 11/1999 |

OTHER PUBLICATIONS

Dutta, S. Architecture and design of NX-2700: A programmable single-chip HDTV all-format-decode-and-display processor, IEEE Transactions on Very Large Scale Integration (VLSI) Systems, vol. 9, No. 2, Apr. 2001, pp. 313-328.*
Saski et al., T. MIXS: A mixed level simulator for large digital system logic verification, Proceedings of the 17th Conference on Design Automation, Jun. 1980, pp. 626-633.*
Taylor et al., S. Functional verification of a multiple-use, out-of-order, superscalar Alpha processor—the DEC Alpha 21264 microprocessor, Proceedings of the 35th annual Conference on Design Automation, May 1998, pp. 638-644.*
Chang et al., Y.-S. Verification of a microprocessor using real world applications, Proceedings of the 36th ACM/IEEE Conference on Design Automation, Jun. 1999.*

(Continued)

*Primary Examiner*—Russell Frejd
(74) *Attorney, Agent, or Firm*—Duane Morris LLP

(57) ABSTRACT

A method of emulation or functional testing of a first microprocessor in its functional environment including one or several peripherals and at least one internal bus of communication between this first microprocessor and its peripherals, from a second microprocessor, consisting of deactivating the first microprocessor, using the communication bus(es) to communicate between the two microprocessors and the peripheral(s), and activating the second microprocessor, wherein the first microprocessor communicates with the second microprocessor over a series link and wherein the second microprocessor is realized by a simulation model.

8 Claims, 2 Drawing Sheets

OTHER PUBLICATIONS

Hattori et al., T. Design methodology of a 200MHz superscalar microprocessor: SH-4, Proceedings of the 35th annual Conference on Design Automation, May 1998, pp. 246-249.*

Kumar et al., J. Logic and functional verification in a commercial semiconductor environment, Proceedings 1998 Int. Conference on Application on Concurrency to System design, Mar. 1998, pp. 8-15.*

Kaiser, Michael R., "DMA Emulation and its Use in Microprocessor System Troubleshooting", Wescon Technical Papers, Western Periodicals Co. North Hollywood, US, vol. 36, Nov. 17, 1992, pp. 718-723, XP000354187.

* cited by examiner

EMBEDDED MICROPROCESSOR EMULATION METHOD

PRIORITY FILING

This application claims priority rights under 35 U.S.C. § 119 from French application No. 01/03853, filed on Mar. 21, 2001, the entire disclosure of which is hereby incorporated by reference.

BACKGROUND OF THE INVENTION

1. Field of the Invention

The present invention relates to the field of circuits including a microprocessor associated with other functions, peripheral or not. These are, for example, microcontrollers or other more complex circuits including a microprocessor, peripherals and/or any other processing device, for example, another microprocessor, a digital signal processing circuit (DSP), etc.

The present invention more specifically relates to bi-processor systems where one of the processors must momentarily provide its peripherals to another processor. This may be, for example, the emulation of an embedded microprocessor, that is, of a processor integrated in a circuit of which it only is a portion and having inputs/outputs which are not accessible from the outside of the integrated circuit. During the emulation, the peripherals of the embedded processor are under control of an external microprocessor physically or virtually reproducing the embedded microprocessor. Any block having its operation controlled by the microprocessor, such as timers, input/output ports, memories, etc. is defined as a peripheral.

2. Discussion of the Related Art

The present invention will be described hereafter in relation with an example of application to the emulation of an embedded microprocessor. However, it more generally applies to any system using two processors and requiring for one of the processors to take control over peripherals of the other processor, as well as to the testing of the functionalities of peripherals of an embedded microprocessor.

The emulation consists of controlling the development of a program while modifying its environment as little as possible. Most often, embedded processor must be emulated in their operating conditions on an application board. In other words, they are associated with other circuits, peripheral or not, formed for example of integrated circuits with which they are assembled on a printed circuit board. The present invention more specifically applies to emulators for which the circuit to be emulated remains connected on the application board.

A first emulation solution consists of replacing the circuit integrating the microprocessor of the application board with a probe, connected to an intermediary interface board on which is assembled a specific microprocessor reproducing the characteristics of the embedded microprocessor. This specific microprocessor, known as the "bound-out chip", makes accessible, from input/output terminals of the integrated circuit, the connections of the internal bus of the embedded microprocessor. With such a solution, the executed program is stored in a memory of the emulator instead of being stored in a memory integrated with the embedded microprocessor. The control of the bus of access to these memories enables obtaining high-performance emulation functionalities such as the recording of the trace, the performance analysis or the code coverage analysis. The major disadvantage of this solution is that all the functions of the replaced circuit must be implemented in the emulator. This solution must thus be adapted to each application of the circuit. Another disadvantage of such a solution is that it does not leave the integrated circuit to be emulated in its real operating conditions. In particular, the tested circuit does not correspond to the real circuit.

A second known solution, derived from the first one, consists, to reduce the number of terminals of the integrated circuit containing the microprocessor to be emulated, of using multiplexers to share its input/output terminals. A disadvantage of this solution is that this does not enable testing the circuit in real operating conditions. Like the first solution, this solution is not versatile and must be adapted to each application of the circuit.

A third solution, known as the BDM or Nexus solution, consists of leaving the program execution to the embedded micro-processor and of monitoring its operation via a link to an external device. Such an emulation solution using only resources internal to the circuit, provides only few high-performance emulation functionalities such as those listed for the first solution.

SUMMARY OF THE INVENTION

The present invention aims at providing a novel solution for the emulation of an embedded microprocessor or for the functional testing of its peripherals. On the one hand, it aims at enabling perfecting the program with the circuit in its application, with all the desired flexibility. On the other hand, it aims at enabling testing the peripherals in the circuit, independently from the bare core.

The present invention also aims at differentiating the peripherals from the core of the embedded microprocessor so that only the role of the microprocessor and of all or part of its memories is played by the outside.

The present invention also aims at enabling emulation while the embedded microprocessor is in its application environment, that is, while the integrated circuit in which it is included is connected with other circuits, peripheral or not, on an application board.

The present invention also aims at minimizing the number of terminals of the circuit integrating the embedded microprocessor, by enabling a communication of series type between the circuit and the emulator. "Series link" designates a link over a reduced number of wires as compared to the number of conveyed bits, whatever the size of the reduction.

More generally, the present invention aims at providing a method and a system enabling a microprocessor, in place in its functional environment, to provide access to its communication bus with its peripherals to another physical or virtual processor.

To achieve these objects, the present invention provides a method of emulation or functional testing of a first microprocessor in its functional environment including one or several peripherals and at least one internal bus of communication between this first microprocessor and its peripherals, from a second microprocessor.

The present invention further provides an emulator of a first microprocessor, including a microprocessor core functionally equivalent to that of the first microprocessor and means for using the peripherals and buses of the first microprocessor in an emulation phase.

Comparing some features of the present invention with the three prior art solutions mentioned hereabove, it can be considered that:

the circuit to be emulated remains in place during the emulation in the third known solution, as well as in the present invention;

the circuit used in the emulation is the same as that of the final application in the third known solution, as well as in the present invention; and the memories and emulation functions are outside of the circuit in the first and second known solutions as well as potentially in the present invention, which provides a great flexibility to the emulator.

The present invention is the only one among the described solutions to gather all the above-described features and advantages, as well as others.

The foregoing objects, features and advantages of the present invention will be discussed in detail in the following non-limiting description of specific embodiments in connection with the accompanying drawings.

DETAILED DESCRIPTION

Figure 1:
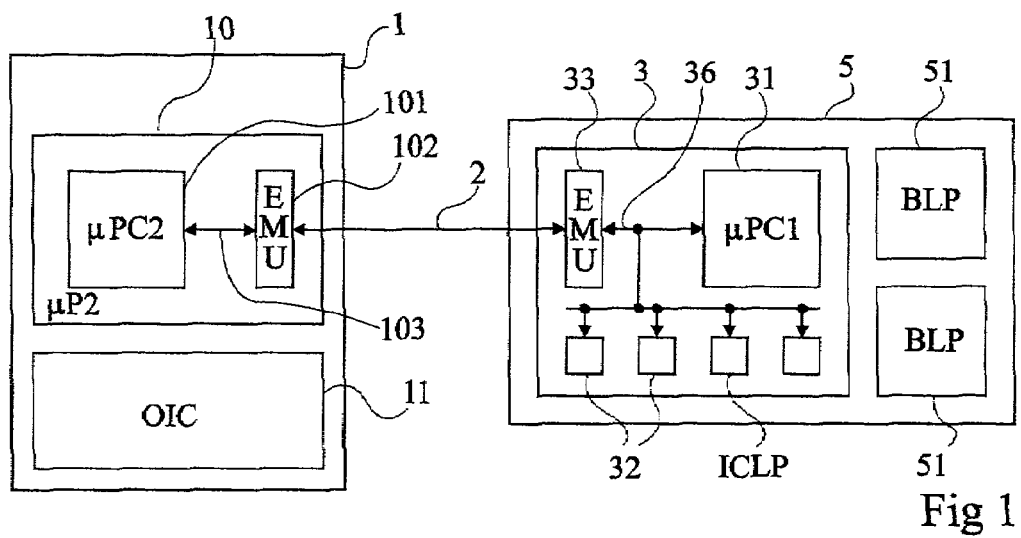
FIG. 1 very schematically shows in the form of blocks an embodiment according to the present invention of a circuit integrating an embedded microprocessor, assembled on an application board and associated with an emulator.

Same elements have been designated with same references in the different drawings. For clarity, only those system elements and those method steps which are useful to the understanding of the present invention have been shown in the drawings and will be described hereafter. In particular, the internal structures of the microprocessors have only been illustrated for the explicit elements for the implementation of the present invention. Further, the actual steps of emulation and functional testing are conventional and are no object of the present invention.

The present invention is based on the fact that the peripherals of the embedded microprocessor, on the so-called application board, communicate with the bare core of this microprocessor via at least one bus. For this reason, the processor core on the application board side is, according to the present invention, modified to contain emulation logic. This, to enable another microprocessor to communicate with this (these) bus(es) of access to the peripherals of the embedded microprocessor, through an interface.

On the emulator side, the core of the embedded microprocessor is reproduced, physically or virtually. When the emulation mode is chosen, the emulator is connected to the application board by means of a series or parallel interface. The microprocessor to be emulated of the integrated circuit is functionally deactivated. All instructions are processed by the processor core on the emulator side, the communication between the emulator and the application board being limited to the accesses to the peripherals.

The (program and data) memories which are used in the emulation are, preferably, transferred outside of the integrated circuit, that is, into the emulator. A logic enabling transferring these memories is thus present in the circuit on the application board side. As an alternative, the emulator exploits all or part of the integrated memories with the embedded micro-processor or present on the application board.

A feature of the present invention is that the embedded microprocessor is in its functional environment. In the sense of the present invention, this means that the embedded microprocessor is assembled on the application board. More widely, the microprocessor may be assembled on a test board reproducing the peripherals of the application integrated or not with the microprocessor, or be integrated with all its peripherals (case of a smart card, for example).

The present invention will be described hereafter in relation with an embedded microprocessor assembled on an application board. It however more generally applies to the emulation of a microprocessor in its functional environment.

FIG. 1 very schematically shows in the form of blocks an embodiment of a system of emulation of a circuit 3 integrating an embedded microprocessor and various peripherals according to the present invention. Emulator 1 is symbolized by a block including a microprocessor 10 (μP2) and annex circuits 11 (OIC). Microprocessor 10 conventionally includes a core 101 (μPC2) and an interface 102 (EMU) connecting a bus 103 internal to microprocessor 10 to a link 2 between the emulator and the circuit to be emulated. The emulator has been shown in a very simplified manner. Among circuits 11, memories and other control and exploitation devices, can generally be found.

Circuit 3 is shown as assembled on a printed circuit wafer or board 5 corresponding to the application board, that its, in its functional environment. Integrated circuit 3 is thus associated with peripherals 51 (BLP) on the application board. These may be, for example, memories, other microprocessors, measurement circuits, etc. As an alternative, the application board also is a test board (prototype).

Circuit 3 conventionally includes an embedded micro-processor, only the bare core 31 (μPC1) of which has been shown in FIG. 1, and various integrated peripherals 32 (ICLP). Among these peripherals, memories, input/output circuits, etc. can be found. According to the present invention, circuit 3 also includes an interface circuit 33 (EMU) connecting a bus 36, internal to the embedded microprocessor, to link 2. Bus 36 directly communicates with bare core 31 of the embedded microprocessor.

A feature of the present invention is that, preferably, only the bare core of the embedded microprocessor and, if necessary, all or part of the memories which are associated therewith, are emulated by emulator 1. The rest of the integrated circuit components (including the peripherals integrated therein) as well as the peripherals of the application board are not emulated and thus remain in a real operating situation. In the sense of the present invention, "emulating" means the fact of transferring an element outside of the application board while maintaining an identical operation for this element. In FIG. 1, circuit 3 has not been detailed. Reference will be made to the description of FIG. 3 for more details of a specific example.

Figure 2:
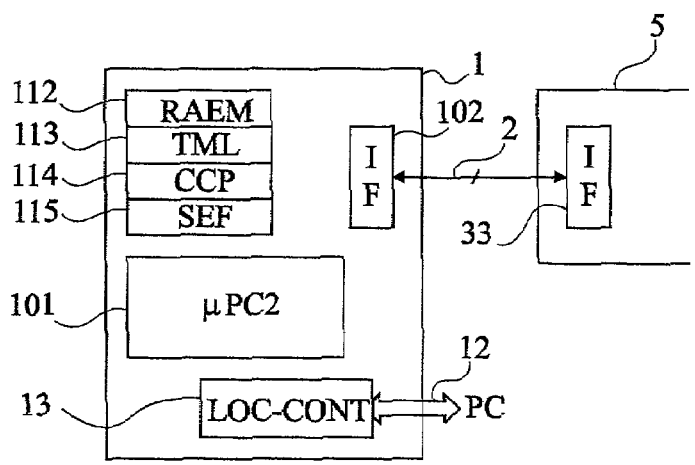
FIG. 2 shows in more detail an embodiment of an emulator according to the present invention.

FIG. 2 shows an example of an emulator 1 according to the present invention. Not all the components of this emulator have been shown and its microprocessor has been symbolized by its bare core 101 only. Among the other circuits (11, FIG. 1) symbolized in the form of blocks, the emulator generally includes an emulation memory of RAM type (RAEM, 112) and logic circuits 113, 114, and 115. For example, a circuit 113 (TML, Trace Module Logic) enables the emulator to display in real time what happens in the embedded microprocessor (TRACE mode), a circuit 114 (CCP Code Coverage, Profiler) analyses the coverage rate of the program code and a circuit 115 (SEF, Specific Emulation Functions) contains other functions specific to the emulation. Emulator 1 communicates with a control system (for example, a PC microcomputer) over a bus 12 connected, on the side of emulator 1, to a local controller (LOC-CONT) 13. Emulator 1 includes an interface circuit 102 (IF), in the same way as application board 5 includes an interface circuit 33.

Figure 3:
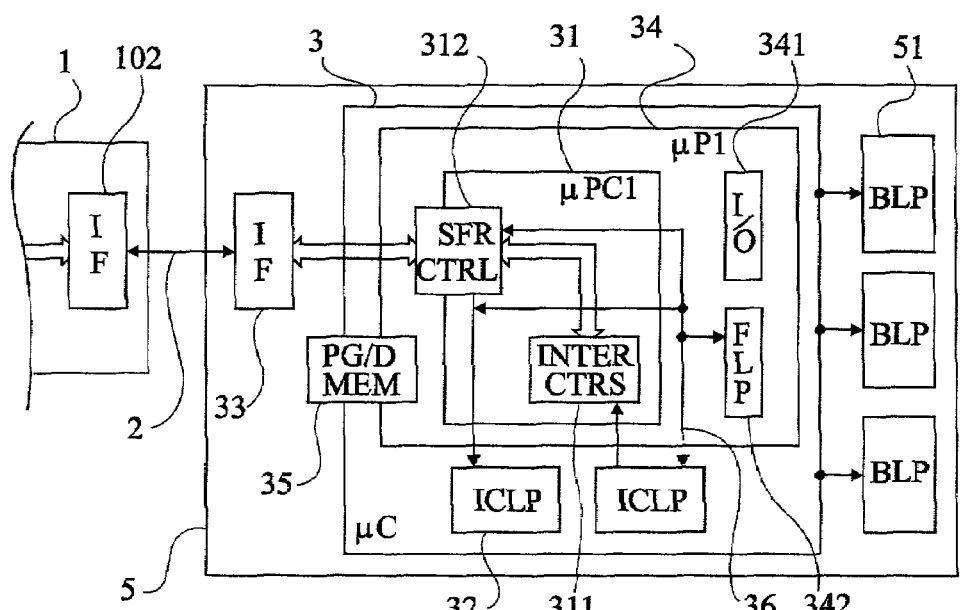
FIG. 3 shows in more detail an embodiment according to the present invention of a circuit integrating an embedded microprocessor, assembled on an application board.

FIG. 3 details the application board side. Link 2 interconnects interface circuits 33 and 102 according to the present invention. In FIG. 3, circuit 3 (μC) has been shown in more detail than in FIG. 1. It includes integrated peripheral circuits (ICLP) 32. Core 31 (μPC1) of the embedded microprocessor has been shown as being included in a block 34 symbolizing this microprocessor (μP1). Block 34 includes input/output circuits 341 (I/O) as well as, if necessary, peripheral circuits 342 (FLP).

From the emulation point of view, peripherals 342 are handled as peripherals 32 and 51. Thus, the present invention enables making no difference between the different peripherals accessible over the bus, which respects the real operating conditions. Within bare core 31, only one interrupt controller 311 (INTER CTRS) and one circuit 312 for managing the bus of communication between core 31 and the peripherals have been shown. For example, said bus is the special function register bus (SFR CTRL) of a microprocessor of type 8051. In this embodiment of the present invention, the bus communicates with controller 311 and, outside of the core, with interface circuit 33. Bus 36 bidirectionally connects circuit 312 to the different peripherals 32 and 342. A block 35 illustrating a program and/or data memory (PG/D MEM) has been shown astride the lines separating microprocessor 34 from circuit 3. This, to show that this memory may indifferently be a peripheral of the level of board 5, a peripheral of the level of circuit 3, or a peripheral of the level of microprocessor 34.

The microprocessor to be emulated is used in its environment by exploiting peripherals 51 present on application board 5 and integrated peripherals 32 and 342.

In the shown example of implementation of the present invention, the core of the embedded microprocessor contains all the logic necessary to execute the instructions. Core 31 may also contain the interrupt controller able of managing registers and interrupts specific to the implementation of the present invention.

For an emulation operation, core 101 of the emulator executes the program, preferably using the program memory (111) and the data memory (112) of the emulator. It communicates with application board 5 by means of the dedicated emulation interface. The peripherals (including input/output ports 341) are in normal operation and under control of microprocessor 101 of the emulator. The interrupts are managed by interrupt controller 311 of the application board, then sent to the core of microprocessor 101 on the emulator side. Some interrupts may, exceptionally, be directly managed by the emulator. Such will be the case, for example, for software interrupts.

An advantage of the present invention is that only the bare core of the embedded microprocessor and, if necessary, all or part of the memories associated therewith, are replaced by the emulator. All its peripherals, be they integrated or present on the application board, are active during the emulation (or during their functional testing). The peripherals remain in the functional environment, and need not be modeled in the emulator.

Among the other advantages of the present invention, one should note:

a possibility of testing in real operating conditions for in situ diagnosis purposes;

an easy upgrading of the emulator if it is made in programmable form (hardware or software). Each new upgrading of the processor core may be immediately loaded in that of the emulator and the upgrading is performed without physically changing any component. This difference is significant as compared to emulation systems in which all the emulation functions are executed by the embedded processor;

the use of a same emulator for different integrated circuits containing the same embedded microprocessor, even if other circuits or processors are integrated with or are assembled on the application board; and the saving of a complex implementation of peripherals on the emulator side.

The implementation of the present invention requires a few additional pins on the circuit integrating the embedded microprocessor. According to a preferred embodiment of the present invention, the connection between the emulator and the application board is a connection of series type. The serializing is performed by interface circuits 102 and 33. An advantage of a series connection is that it saves pins on the integrated circuit. The present invention requires, in addition to an access to the data bus, a few control bits (for example, an interrupt signal, an enable signal, a read/write control signal, and a clock signal). For example, five pins are enough for a series interface of JTAG type, or even less for an elementary series interface including a bidirectional data signal and a clock signal. Further, these pins may already be available in the integrated circuit and be made accessible by multiplexing. A functional difference between a series interface and a parallel interface is that a real time operation is not always permitted by means of a series interface. However, in most applications, accesses to the peripherals occur after the initialization to program the control registers and after interrupts. Afterwards, the number of accesses to the peripherals is relatively small and is most often acceptable by a user having no access in real time. However, in applications requiring a large number of interrupts, the transfer rate may be increased in several ways, for example, by multiplying the data signals or by performing high-frequency transfers asynchronously with respect to the microprocessor, while keeping, preferably, the object of the minimizing the number of pins.

Figure 4:
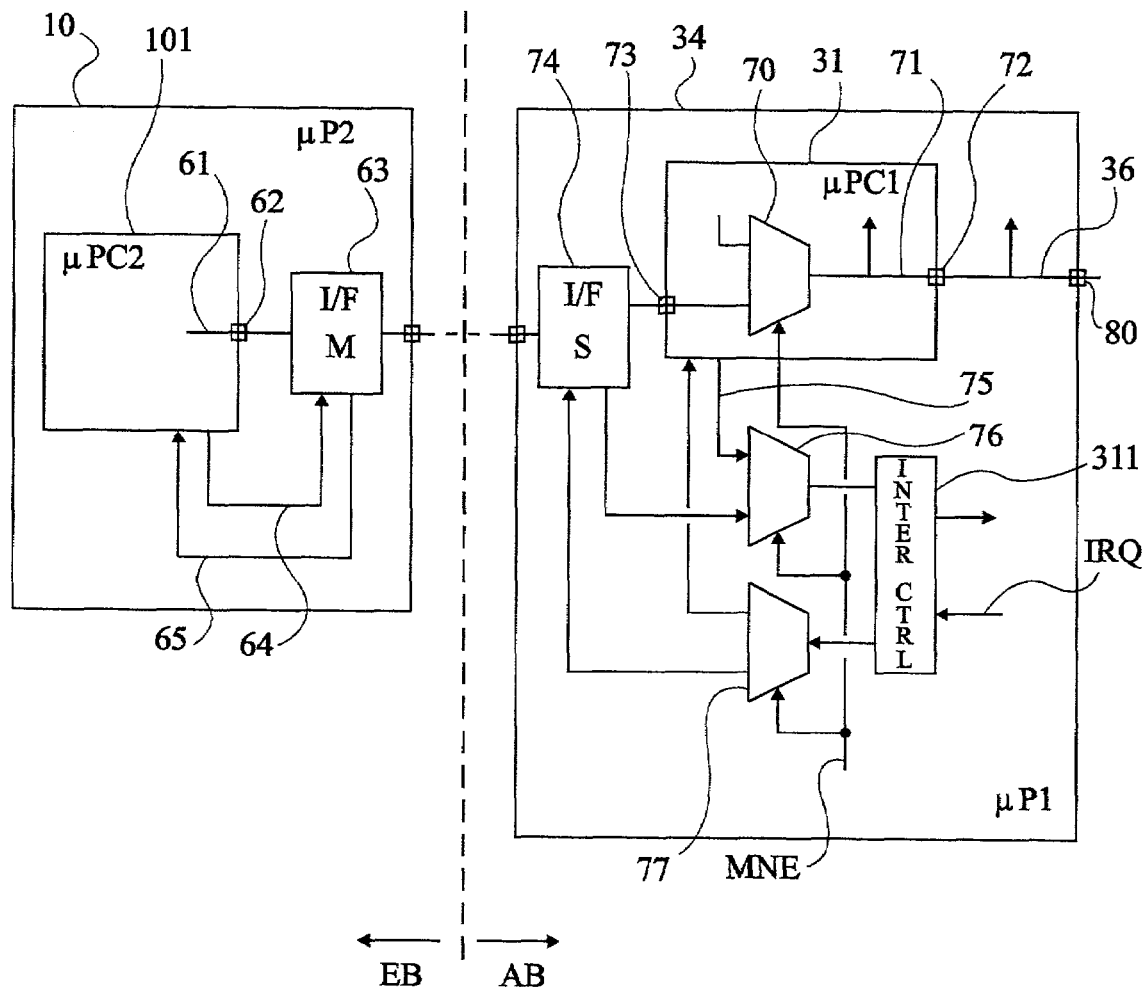
FIG. 4 partially and very schematically shows the elements of two microprocessors which take part in the implementation of an embodiment of the present invention.

FIG. 4 illustrates an example of a structural modification of an embedded microprocessor and of an emulator microprocessor to implement the present invention.

In the example of FIG. 4, the interface circuit specific to the present invention is symbolized by a block 63 (I/F M) forming a master circuit in emulation mode. Circuit 63 receives bus 61 coming from terminals 62 of core 101 and signals 64 also coming from core 101 and used to control the interrupt processing, especially to initialize read and write operations in the microprocessor interrupt controller on the application board. Circuit 63 performs the read and write operations and provides to core 101 over a link 65 the results of the operations.

On the application board side (AB), only microprocessor 34 (μP1) and the internal components added by the present invention have been shown in FIG. 4. The structure of the core of microprocessor 31 is similar to that of microprocessor 101. A multiplexer 70, selecting the control of the peripheral access bus, is controlled by a signal indicative of operating mode MNE between the normal mode and the emulation mode. A first input of multiplexer 70, dedicated to the normal mode, receives the conventional signals of bus 71 of the microprocessor core to provide them on terminals 72 over an internal bus 71. At the output of terminals 72, bus 71 continues, in the form of bus 36, until terminals 80 of microprocessor 34 to the external registers and, within microprocessor 34, to the integrated peripherals such as, for example, sequencers and the input/output ports. A second input of multiplexer 70 is connected to input terminals 73 of core 31 connected to an interface circuit 74 according to the present invention. This circuit, symbolized by a block 74 (I/F S), forms a slave interface circuit in emulation mode. An output 75 of core 31 conveying the interrupt control signals is, according to the present invention, connected to a first input of a multiplexer 76. A second input of multiplexer 76 receives equivalent signals from interface 74 for the emulation mode. Multiplexer 76 is controlled by signal MNE. Similarly, the signals coming from interrupt controller 311 indicating the state of the interrupts (status registers) cross a switcher 77 for distributing the state of the interrupt registers. A first output of switcher 77 is connected to core 31 and a second output sends the signals to interface 74, which will shape them before sending to the emulator. Switcher 77 is also controlled by signal MNE.

The rest of the microprocessor components are conventional. Further, the practical realization necessary to the implementation of the present invention can be deduced from the functional indications described hereabove according to the functions integrated in the embedded microprocessor. In particular, although the difference between multiple-wire (buses) and single-wire links has not always been made, this difference is within the abilities of those skilled in the art based on the functional indications given hereabove. Further, different sequences are of course possible and the number and function of the selection multiplexers and switchers between the normal and emulation operating modes may have to be modified.

Of course, the present invention is likely to have various alterations, modifications, and improvements which will readily occur to those skilled in the art. In particular, although the emulator has been described in relation with a hardware example, all emulation functions may be gathered in software means, the reproduced microprocessor core then being a virtual core (a simulation model).

Further, the embedded microprocessor core must be able to be deactivated and must thus include signals and/or instructions necessary to this deactivating. For example, a specific signal or a reset control signal is forced, the execution of the program internal to the microprocessor being then allowed from the moment that the emulation mode is not selected. The specific signal corresponds, for example, to signal MNE then accessible from a pin of the circuit integrating the embedded microprocessor.

Moreover, although reference has been made in the foregoing description to an internal bus 36, several buses may be used. Referring to FIG. 2, this amounts to saying that bus 36 is actually formed of two buses (or more) connecting the core to peripherals 342, 32, or 51. For example, in the case of a micro-processor of type 8051, access may be given to the SFR bus as well as to a memory bus.

Finally, in some cases, part of the peripherals may be transferred to the emulator side, for example, to respect a need for real-time operation.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method of emulation or functional testing of a first microprocessor in its functional environment including one or several peripherals, the method comprising the steps of:
   interfacing the first microprocessor with the one or several peripherals via at least one bus internal to the first microprocessor, the first microprocessor implanted on an application board;
   performing a simulation model to generate a virtual second microprocessor;
   series linking the virtual second microprocessor with the first microprocessor; and
   deactivating the first microprocessor to emulate or functionally test the first microprocessor.

2. The method of claim 1, further comprising the step of processing interrupts from the one or several peripherals using the virtual second microprocessor.

3. A circuit comprising:
   a first microprocessor integrated with peripherals and at least one first bus internal to the first microprocessor providing communication between the first microprocessor and the peripherals;
   means for deactivating a bare core of the first microprocessor and for making accessible the at least one first bus from outside of the circuit to emulate or functionally test the first microprocessor; and
   a terminal of application of a selection signal between a normal operating mode and an emulation mode,
   wherein the bare core of the first microprocessor integrates at least one first multiplexer to control the at least one first bus, selecting either a second bus coming from within the bare core, or a third bus coming from an interface circuit outside of the circuit.

4. The circuit of claim 3, further comprising at least one switcher for distributing the state of interrupt registers to the bare core of the first microprocessor or the interface circuit, and a second multiplexer for selecting interrupt control signals between the bare core of the first microprocessor and the interface circuit.

5. A method of emulation or functional testing of a first microprocessor in its functional environment including one or several peripherals, from a second physical microprocessor, the method comprising the steps of:
   interfacing the first microprocessor with the one or several peripherals via at least one bus internal to the first microprocessor;
   series linking the second physical microprocessor with the first microprocessor;
   deactivating the first microprocessor; and
   activating the second microprocessor to emulate or functionally test the first microprocessor.

6. The method of claim 5, further comprising the step of processing interrupts from the one or several peripherals using the second physical microprocessor.

7. A circuit comprising:
   a first microprocessor integrated with peripherals and at least one first bus internal to the first microprocessor providing communication between the first microprocessor and the peripherals; and
   means for deactivating a bare core of the first microprocessor and for making accessible the at least one first bus from outside of the circuit to emulate or functionally test the first microprocessor,
   wherein the bare core of the first microprocessor integrates at least one first multiplexer to control the at least one first bus, selecting either a second bus coming from within the bare core , or a third bus coming from an interface circuit outside of the circuit and wherein the at least one first internal bus is a special function register bus.

8. The circuit of claim 7, further comprising at least one switcher for distributing the state of interrupt registers to the bare core of the first microprocessor or the interface circuit, and a second multiplexer for selecting interrupt control signals between the bare core of the first microprocessor and the interface circuit.

* * * * *